June 4, 1968  S. HEJZLAR  3,386,284
TORQUE GAUGE

Filed July 1, 1965  3 Sheets-Sheet 1

INVENTOR.
SID HEJZLAR
BY
ATTORNEYS.

June 4, 1968  S. HEJZLAR  3,386,284
TORQUE GAUGE

Filed July 1, 1965  3 Sheets-Sheet 2

INVENTOR.
SID HEJZLAR
BY
*Robertson, Smythe, Bryan & Parmelee*
ATTORNEYS.

June 4, 1968     S. HEJZLAR     3,386,284
TORQUE GAUGE
Filed July 1, 1965     3 Sheets-Sheet 3
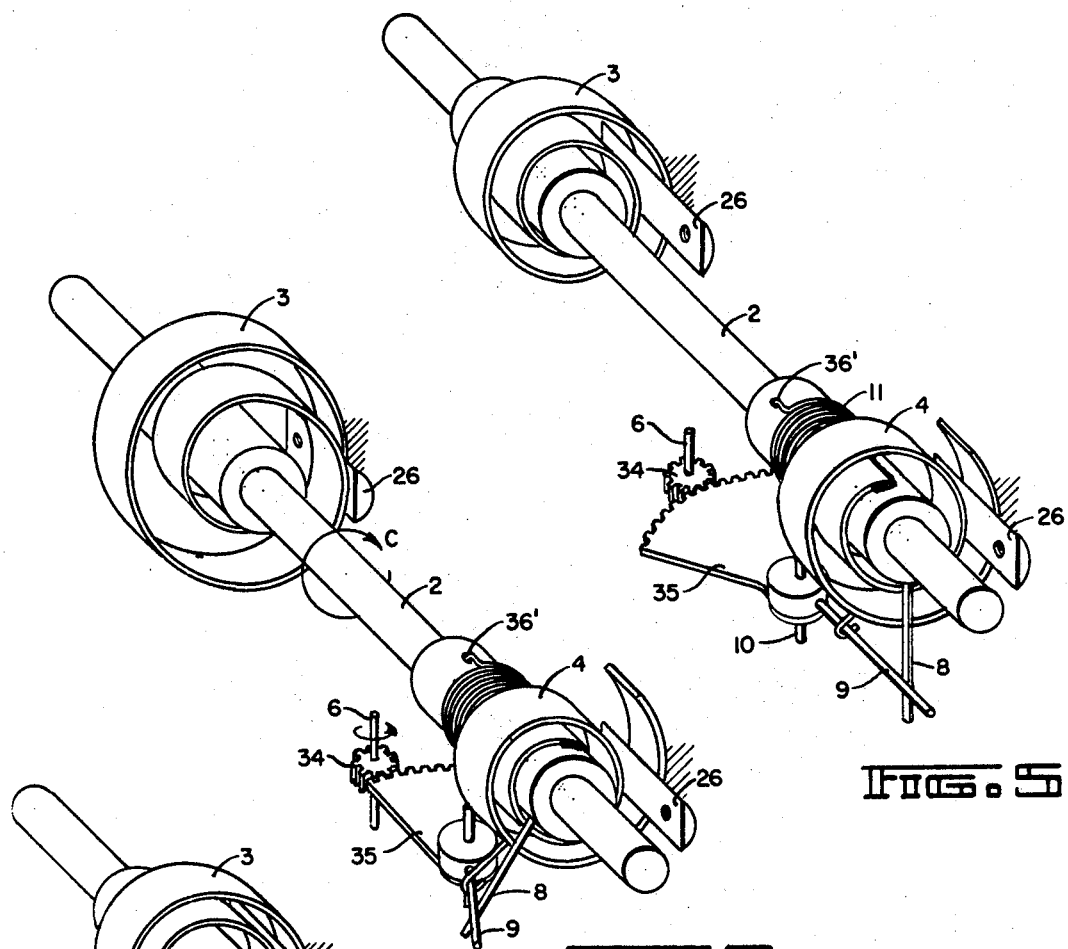
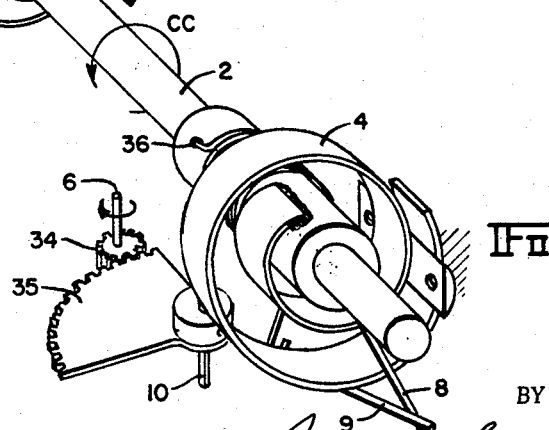
INVENTOR.
SID HEJZLAR
BY
ATTORNEYS.

United States Patent Office 3,386,284
Patented June 4, 1968

3,386,284
TORQUE GAUGE
Sid Hejzlar, Flushing, N.Y., assignor to Aero-Chatillon Corporation, New York, N.Y., a corporation of New York
Filed July 1, 1965, Ser. No. 468,769
6 Claims. (Cl. 73—139)

ABSTRACT OF THE DISCLOSURE

This invention provides improvements in torque gauges. The improved torque gauge includes opposed spiral springs mounted on a torsion shaft. The springs are placed under initial stress to resist the turning movements of the torsion shaft in either direction of turning. The turning movements of the shaft are translated into movements of a gauge dial pointer by actuating means which include engaging rotary arms whose effective lengths change during operation of the gauge. The rotary arms are arranged so as to move in a manner which maintains a straight line relationship between the angular movement of the torsion shaft and the angular movement of the gauge dial pointer.

---

The invention relates to improvements in torque gauges.

In my gauge construction, opposed spiral springs placed under initial stress resist turning movements of an input shaft in either direction of turning, and the turning movements of this shaft are translated into movements of a gauge dial pointer through the medium of a system including engaging rotary arms whose effective lengths change during operation of the gauge, but do so in a manner which preserves a straight line relationship between angular movement of the input shaft and angular movement of the gauge dial pointer.

By virtue of this construction it is possible to secure improved linearity and to balance out hysteresis of the springs in a gauge employing a minimum number of moving parts in an extremely compact and simple instrument.

With reference to the accompanying drawings I shall now describe the best mode contemplated by me for carrying out my invention.

FIGS. 5, 6 and 7 are enlarged schematic views of essential portions of the operating mechanism of the gauge, FIG. 5 showing the parts in the position which they occupy when at rest without any torque being applied, FIG. 6 showing the position which the parts occupy with clockwise application of force, And FIG. 7 showing the parts in the position occupied upon application of counterclockwise torque.

Figure 2:
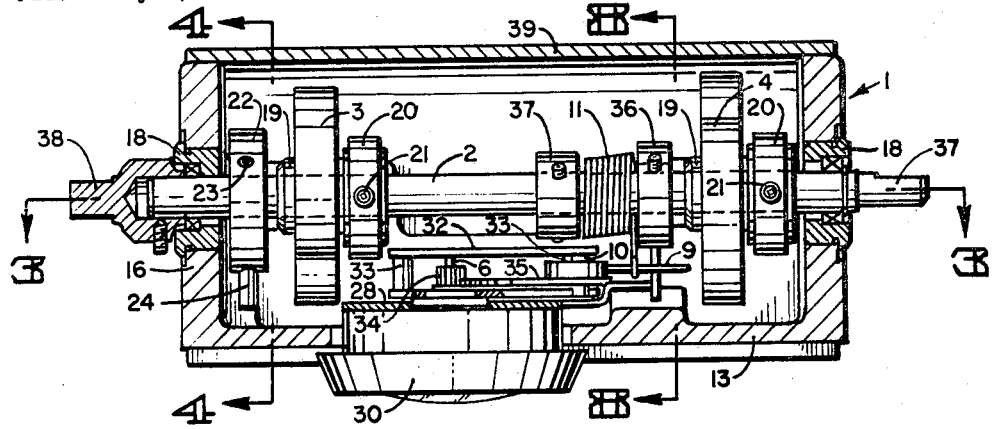
FIG. 2 is a longitudinal sectional view taken as indicated at 2—2 in FIG. 1.
Figure 8:
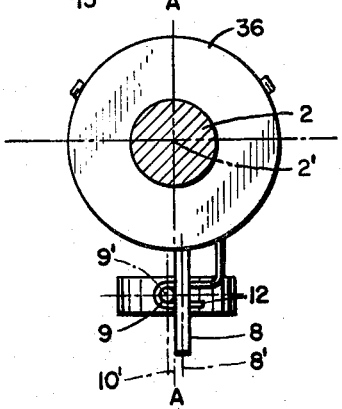

FIG. 8 is an enlarged cross sectional view taken as indicated at 8—8 in FIG. 2.

In its general arrangement, my torque gauge comprises a frame 1, an input shaft 2, sometimes called herein a "first shaft," mounted in the frame to receive torque efforts turning the shaft about its axis in either direction, a first spring means such as the spiral spring 3 secured at its inner end to the shaft and at its outer end to the frame, a second spring means such as the spiral spring 4 secured at its inner end to the shaft and at its outer end to the frame, the two means being mounted in opposed relation so as to resist turning movements in either direction of turning the input shaft 2. Both springs are placed under initial stress so that rotary movement of the shaft 2 in one direction increases the load on spring 3 and decreases the load on spring 4, while rotary movement of the shaft in the other direction decreases the load on spring 3 and increases the load on spring 4.

Figure 1:
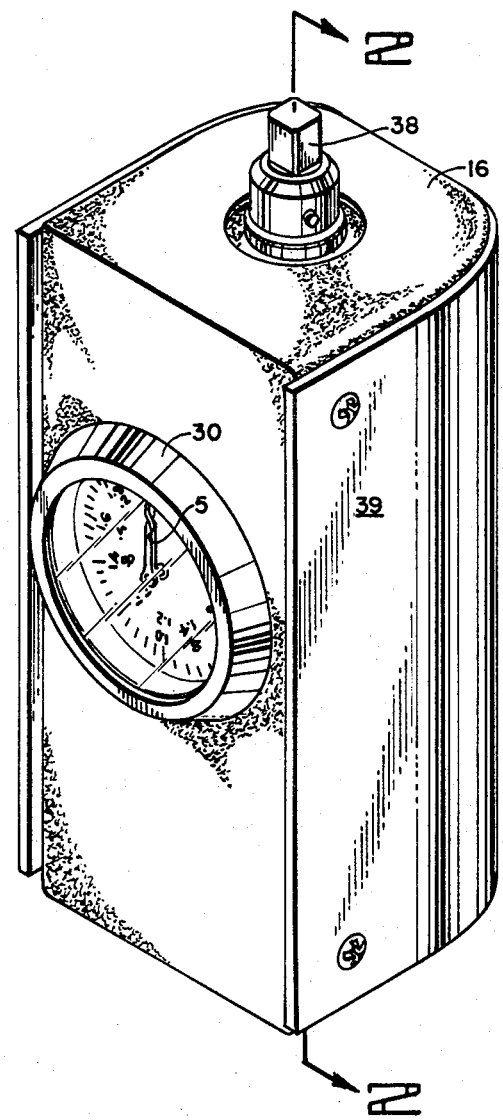
FIG. 1 is an isometric perspective view of a gauge embodying the invention.
Figure 3:
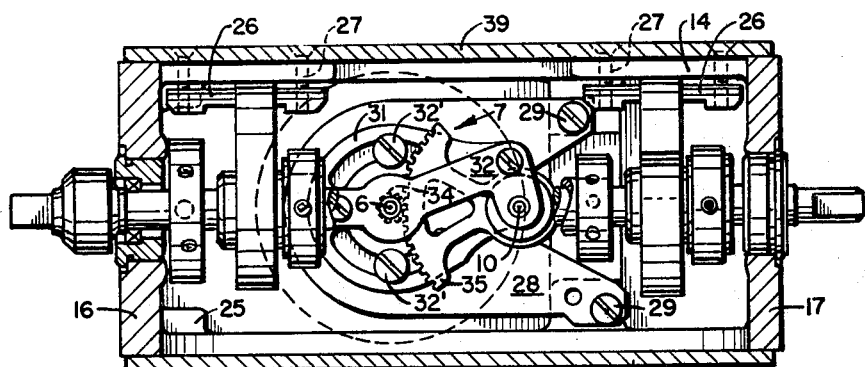
FIG. 3 is a longitudinal sectional view taken as indicated at 3—3 in FIG. 2.

A gauge dial pointer 5 (FIG. 1) and actuating shaft 6 therefore (FIGS. 2 and 3) are rotatably mounted in relation to the frame, and mechanical actuating means indicated generally at 7 are arranged for transmitting rotary motion from the input shaft 2 to the actuating shaft 6 to produce rotary movement of the pointer 5 in either direction depending upon the direction of rotary movement of the input shaft 2.

The mechanical actuating means 7 includes an arm 8 extending laterally from the shaft 2 (see FIGS. 2 and 8). Arm 8 engages another arm 9 extending from a shaft 10 disposed at right angles to the shaft 2. Preferably the axes of shaft 2 and 10 intersect. Arms 8 and 9 comprise a part of a system for translating turning movements of the shaft 2 into movements of the gauge dial pointer 5, such system thus including engaging rotary arms 8 and 9. The point of engagement between the two arms will lie in a plane which contains the axes of shafts 2 and 10. As the gauge is operated, the effective lengths of the arms 8 and 9 will change, but will do so in a manner which preserves a straight line relation between the angular movement of the input shaft and angular movement of the gauge dial pointer. The point of engagement between the two arms will be equidistant from the axes of the respective shafts 2 and 10 for all positions of shaft 2 within the circular sector of movement which corresponds to the maximum capacity of the gauge for both directions of turning under applied torques. When the applied torque is zero, the point of engagement between the arms 8 and 9 lies in the aforesaid plane which contains the axes of shafts 2 and 10. This being so, the cooperative relation between the two arms will be the same for either direction of turning of the input shaft.

The two rotary arms 8 and 9 are held in engagement by a helical spring 11 surrounding input shaft 2, such spring being secured at one end to the input shaft and being attached at its other end to the arm 9 of the shaft 10, as by being hooked around it in the manner shown at 12 in FIG. 8.

Figure 4:
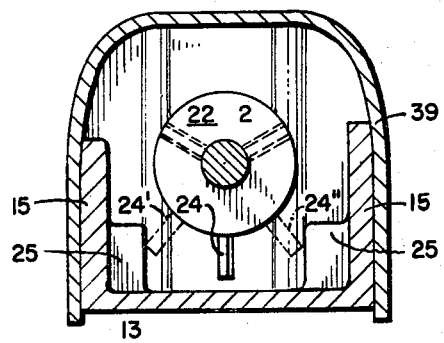
FIG. 4 is a transverse sectional view taken as indicated at 4—4 in FIG. 2.

In my preferred construction this general arrangement of the principal parts of the gauge are incorporated in a design which may now be described in more detail as follows:

The frame 1 which may advantageously be formed as a metal casting comprises a base 13 which forms the front of the instrument, side walls 14, 15 and end walls 16, 17. Input shaft 2 is suitably journaled in the end walls 16, 17 as by means of the anti-friction bearings 18. Springs 3 and 4 have their inner ends brazed or otherwise secured to sleeves 19 surrounding the shaft and adjustably secured thereto as by means of collars 20 fixed to sleeves 19. Set screws 21 fix the position of collars 20 and sleeves 19 with respect to shaft 2. A collar 22 secured to shaft 2 by set screws 23 adjacent end wall 16 of the frame is provided with a projecting pin 24 (FIG. 4) which at maximum turning movement of shaft 2 in one direction or the other engages stops 25 formed on the inside of the frame as shown by the dot-dash lines 24' and 24".

The outer ends of springs 3 and 4 are secured to side wall 14 of the frame as by means fo clips 26. The ends of the springs are carried between such clips and the wall 14 of the frame to be clamped in the desired position of adjustment by means of machine screws 27. By appropriate adjustment of collars 20 and the amount of the spring ends which are carried through underneath the clips 26, the initial stress on the spring is adjusted so that both springs will be under stress for all positions of the parts under applied torques for either direction of turning up to the maximum limits of the gauge. Because of this, the gauge parts will never be subject to lost motion and hysteresis will be substantially entirely balanced out between the two springs.

The operating mechanism, in addition to the principal elements already described, includes a back plate 28 secured as by means of mounting screws 29 (FIG. 3) to suitable projections on the interior of the frame.

Bezel 30 is rotatably secured to back plate 28 in a usual manner. A gauge dial is fixed to the bezel so that by turning the bezel with reference to the body of the gauge a tare adjustment is provided.

The operating mechanism includes a base plate 31 adjustably secured to the back plate 28 as by means of machine screws 32'. Above base plate 31 is a member 32 secured in spaced relation to the base plate as by suitable screws passing through spacing collars 33 (FIG. 2). Journaled in the base plate 31 and member 32 are shafts 6 and 10 of the mechanism previously described. A pinion 34 fixed to shaft 6 engages the teeth of gear sector 35 fixed to shaft 10. The arm 8 of shaft 2 previously described is secured to the shaft 2 by means of a collar 36 and the helical spring 11 previously described is secured at one end to collar 37 which in turn is secured to the shaft 2.

An important feature of my construction resides in the cooperative relation between the rotary arms or pins 8 and 9 and the relationship of the point of contact between these arms and the axes of the two shafts 2 and 10 by virtue of which the effective lengths of the respective arms 8 and 9 are equal to one another for all operating positions within the capacity range of the gauge. Another point of significance is the matter of securing uniform operation of the gauge in either direction. Notice in FIG. 8 that arm 8 is shown with its center-line 8' offset slightly from the plane A—A which contains the axes 2' and 10' of the shafts 2 and 10 so that the side of arm 8 will lie exactly in such plane. Similarly arm 9 is offset so that its center line 9' lies to the other side of plane A—A. As a result the two arms 8 and 9 engage one another exactly in plane A—A when the gauge is at setting zero.

The cooperative relation between the rotary arms 8 and 9 for the several operating positions of the gauge parts will now be further explained with reference to the schematic views, FIGS. 5, 6, and 7.

FIG. 5 shows the position of the operating mechanism at zero torque. The initial stress upon springs 3 and 4 is equal and opposite, and sufficient in amount to permit maximum loading of the gauge in either direction without reducing the stress in either spring to zero. Considering the application of torque in the direction to produce rotation in a clockwise direction C as in FIG. 6, gear sector 35 will have moved in a clockwise direction, rotating shaft 6 of the gauge dial pointer counterclockwise. The application of this torque will have increased the loading on spring 4 and decreased the loading on spring 3. The effective length of rotary arms 8 and 9 will have been increased, each to an equal extent. Therefore each increment of angular movement of input shaft 2 will be represented by an equal increment of angular movement of shaft 10 of the gear sector.

The effect of the helical spring 11 upon the load indicated by the dial of the gauge is substantially nil because the anchoring point 36' of the helical spring rotates with the shaft 2.

In FIG. 7 we see what takes place for counterclockwise rotation of shaft 2 which increases the stress on spring 3, decreases that on spring 4, increases the effective length of both rotary arms 8 and 9 and rotates the shaft 6 of the dial pointer in a clockwise direction.

The gauge preferably is constructed so that torque can be applied to either end of the input shaft 2 as by direct application to the projecting end 37 seen at the right hand of FIG. 2 or at the other end to the coupling 38 fixed to the shaft 2 at the left of FIG. 2. Coupling 38 has a square driving connection, coupling 37 at flattened portion for driving, such being a matter of choice of design. The mechanism is enclosed by the face 13 of the frame and a U-shaped cover 39 (FIG. 4) suitably secured to the sides 14 and 15 of the frame. The U-shaped cover member can advantageously be formed as an aluminum extrusion.

From the foregoing description it will be understood that the invention resides primarily in the construction which includes opposed spiral springs 3 and 4 placed under initial stress to resist turning movement of input shaft 2 in either direction of turning, the turning movements of this shaft being translated into movements of a gauge dial pointer through the medium of a system 7 comprising engaging rotary arms 8 and 9 whose effective lengths change during operation of the gauge, but do so in a manner which preserves a straight-line relationship between angular movement of the input shaft 2 and corresponding angular movement of the gauge dial pointer. By virtue of this combination of elements it is possible to secure improved linearity and to balance out hysteresis of the springs in a gauge employing a minimum number of moving parts as comprised in an extremely compact and simple instrument.

The terms and expressions which I have employed are used in a descriptive and not a limiting sense, and I have no intention of excluding equivalents of the invention described and claimed.

I claim:

1. In a torque gauge having a frame, a first shaft rotatably mounted in the frame to receive torque efforts turning the shaft about its axis in either direction, a first spring means secured to the shaft and also secured to the frame, means for placing said first spring means under initial stress so that rotary movement of the shaft in one direction increases the load on the spring and rotary movement of the shaft in the opposite direction decreases the load on the spring, a second spring means secured to the shaft and also secured to the frame, means for placing said second spring means under initial stress so that rotary movement of the shaft in said one direction decreases the load on the spring and rotary movement of the shaft in the opposite direction increases the load on the spring, a pointer and actuating shaft therefor rotatably mounted in relation to the frame, and mechanical actuating means for transmitting rotary motion from said first shaft to said actuating shaft to produce rotary movement of the pointer in either direction depending upon the direction of rotary movement of said first shaft, the improvement in which said mechanical actuating means comprises an arm extending laterally from said first shaft, said arm engaging another arm extending from a shaft disposed at an angle to said first shaft, the point of engagement between the two arms being equidistant from the axes of the respective shafts from which the arms extend for all positions of said first shaft within the circular sector of movement thereof which corresponds to the maximum capacity of the gauge for both directions of turning under applied torques.

2. A torque gauge constructed according to claim 1, in which said point of engagement between the two arms is equidistant from the axes of the respective shafts from which the arms extend when the applied torque is zero at which zero position said point of engagement lies in a plane which contains the axes of said last-named shafts.

3. In a torque gauge comprising an input shaft rotatably mounted to receive torque efforts turning the shaft about its axis in either direction, a second shaft rotatably mounted at an angle to said input shaft, an arm extending laterally from said input shaft and another arm extending laterally from said second shaft, said two arms engaging one another at a point which is equidistant from the axes of the respective shafts for all positions thereof within the circular sector of their movements which corresponds to the maximum capacity of the gauge for both directions of turning under applied torques.

4. In a torque gauge according to claim 3, the construction in which the axes of said two shafts intersect and in which at zero torque said point of engagement of the two arms lies in a plane which contains the two shaft axes.

5. In a torque gauge according to claim 3, the construction in which said two arms are held in engagement by spring means which are secured to one of the shafts for rotation therewith.

6. In a torque gauge according to claim 3, the construction in which said two arms are held in engagement by a helical spring surrounding said input shaft, said spring being secured at one end to the input shaft and being attached at its other end to the arm of said second shaft.

References Cited

UNITED STATES PATENTS

| | | | |
|---|---|---|---|
| 2,151,953 | 3/1939 | Zimmerman | 73—139 |
| 2,722,834 | 11/1955 | Booth | 73—139 |
| 3,069,903 | 12/1962 | Larson | 73—139 |
| 3,079,785 | 3/1963 | Livermont | 73—16 |
| 3,099,155 | 7/1963 | Dean | 73—139 |

OTHER REFERENCES

Chatillon Bulletin TT–6/54–5m, received September 1954.

RICHARD C. QUEISSER, *Primary Examiner.*

JAMES J. GILL, *Examiner.*

JAMES H. WILLIAMSON, *Assistant Examiner.*